L. B. GRIFFIN.
FILM RECTIFIER.
APPLICATION FILED JUNE 28, 1917.

1,273,359.

Patented July 23, 1918.
2 SHEETS—SHEET 1.

Inventor
L. B. Griffin
By
Attorneys

Witnesses

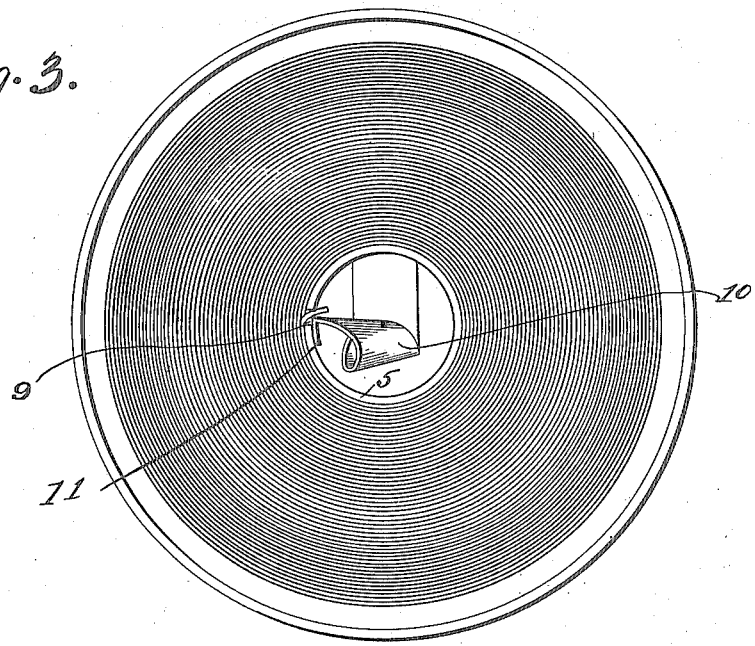
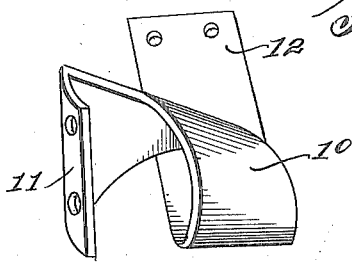
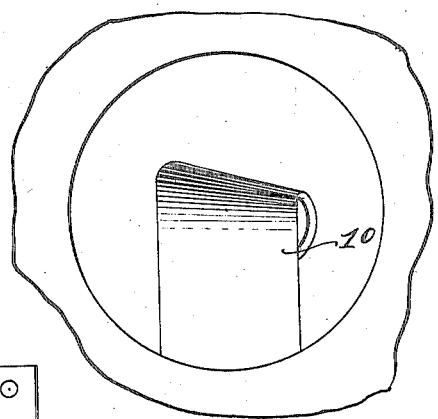
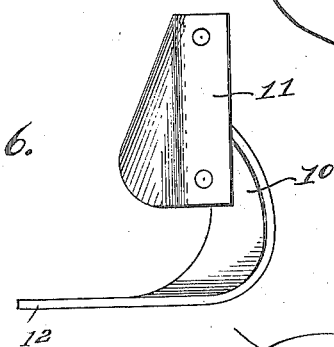

UNITED STATES PATENT OFFICE.

LEWIS B. GRIFFIN, OF CANDOR, NEW YORK.

FILM-RECTIFIER.

1,273,359.

Specification of Letters Patent. Patented July 23, 1918.

Application filed June 28, 1917. Serial No. 177,558.

*To all whom it may concern:*

Be it known that I, LEWIS B. GRIFFIN, a citizen of the United States, residing at Candor, in the county of Tioga, State of New York, have invented certain new and useful Improvements in Film-Rectifiers; and I do hereby declare the following to be a full, clear, and exact description of the invention, such as will enable others skilled in the art to which it appertains to make and use the same.

This invention relates to reels for moving picture machines.

The object of the invention is to provide a support for moving picture films which will obviate the necessity of rewinding them after an exhibition. In the usual operation of rewinding a film after it has been exhibited considerable time is lost, and the film is subjected to that much additional wear, and inasmuch as the film is usually rewound very hurriedly, so that the best care is not employed in the rewinding operation, this process is often the most destructive period in the life of a film. Therefore, I have provided a means for unwinding a film from the center of the reel, in such a way that it may be fed directly into the projector and after exhibition, may be again placed directly upon the unwinding device or reel, without the necessity of the usual reversing operation.

With the above objects in view, and such others relating to the details of construction as may hereinafter appear, my invention will now be fully set forth and described, reference being had to the accompanying drawings.

In the drawings:—

Fig. 3 is a plan view thereof,

Fig. 4 is a perspective view of the guide plate,

Fig. 5 is a bottom view of the guide means, and

Fig. 6 is a side elevation of the guide plate.

Figure 1:
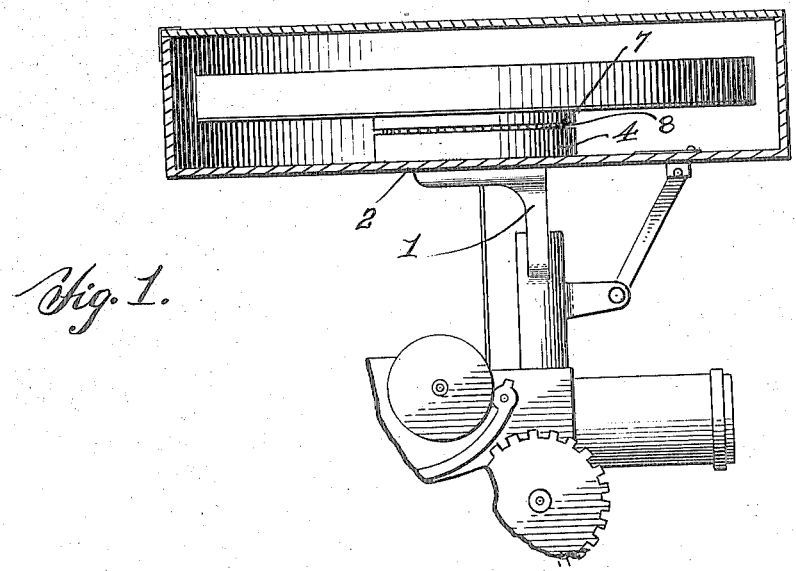
Figure 1 is a side elevation of the device mounted upon a projector support.
Figure 2:
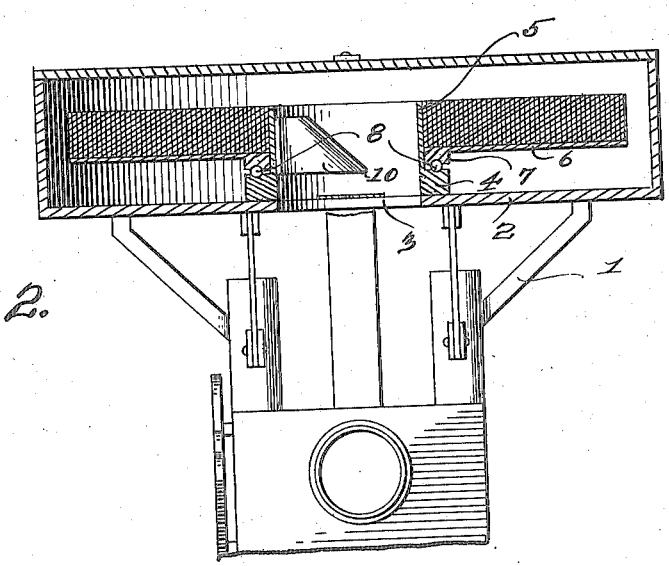
Fig. 2 is a vertical section therethrough.

Referring more particularly to the drawings, 1 represents the upper portion of the frame of a moving picture machine, which, in lieu of the usual upper or unwinding reel support, carries a horizontal base plate 2. Said base plate 2 is provided with a central aperture 3 through which the film is fed to the machine. Surrounding the aperture 3 is a boss 4 within which is formed the tubular sleeve 5. The sleeve 5 forms the center of the support for the roll of film, which may rotate therearound. Also rotatable upon the sleeve 5 is a table 6, the latter fitting loosely over the sleeve, and having a boss 7 which opposes the boss 4, ball bearings 8 interposed between the bosses 4 and 7 to antifrictionally support the tables 6.

Formed in one side of the sleeve 5 is a vertical slot 9 whose edges are rounded so as to constitute of the slot a slide-way through which the film may be fed. Secured to the inside of the sleeve 5 is a guide plate 10 which is conformed to turn the film out of the horizontal direction of the table 6 into the vertical direction which is necessary to properly feed it to the projector machine. Said guide plate 10 is generally conoidal in form, and has one end 11 overturned to be secured along one edge of the slot 9, so that its conoidal contour continues the path of movement from the slot opening. At the lower end of the sleeve 5, the plate 10 is turned into a horizontal foot 12 and is secured to the base 2.

The base plate 2 may support a suitable housing provided with a cover which will meet the regulations governing the exhibition of moving pictures, and any suitable receiving mechanism which may be readily dismounted to permit the removal of the roller film therefrom may be employed in conjunction with the improved unwinding device. Thus, I have found it very convenient to employ a split reel, that is, one in which the hub of the reel is formed in two parts, so that they may be separated to permit the bodily removal of the film for the purpose of inserting it over the sleeve 5 in order to reëxhibit the film. Obviously when the roll has been restored on to the table 6, and around the sleeve 5, the end thereof may be directed through the slot 9 and over the plate 10 for a repetition of the exhibition in which the mechanism of the above described invention is simple and effective, in that it permits the film to be repeated with the rewinding, merely by the use of a rotary table, operative around a fixed sleeve and a guide plate mounted within the sleeve.

What I claim as my invention is:—

1. In a film unwinding device, a stationary support, a tubular sleeve mounted upon the support and having a slot in one side, a rotary table on the sleeve, and a sheet metal guide plate mounted within the sleeve and being shaped from one side of said slot to the lower end of the sleeve to turn the film mounted upon the table into a vertical direction, said plate having its lower end extended in a horizontal portion and secured to the stationary support.

2. In a film unwinding device, a stationary support, a tubular sleeve mounted upon the support and having a slot in one side, a rotary table on the sleeve, and a conoidally shaped plate having one end shaped into a flange and secured to one side of said slot and having its opposite end extended in a horizontal portion at the lower end of the sleeve and secured to the stationary support below the lower end of the sleeve.

In testimony whereof, I affix my signature in the presence of two witnesses.

LEWIS B. GRIFFIN

Witnesses:
NATHAN TURK,
W. H. CUTLER.